Dec. 27, 1932.  R. D. SHIPP  1,892,288
STORAGE BATTERY
Filed Jan. 2, 1925
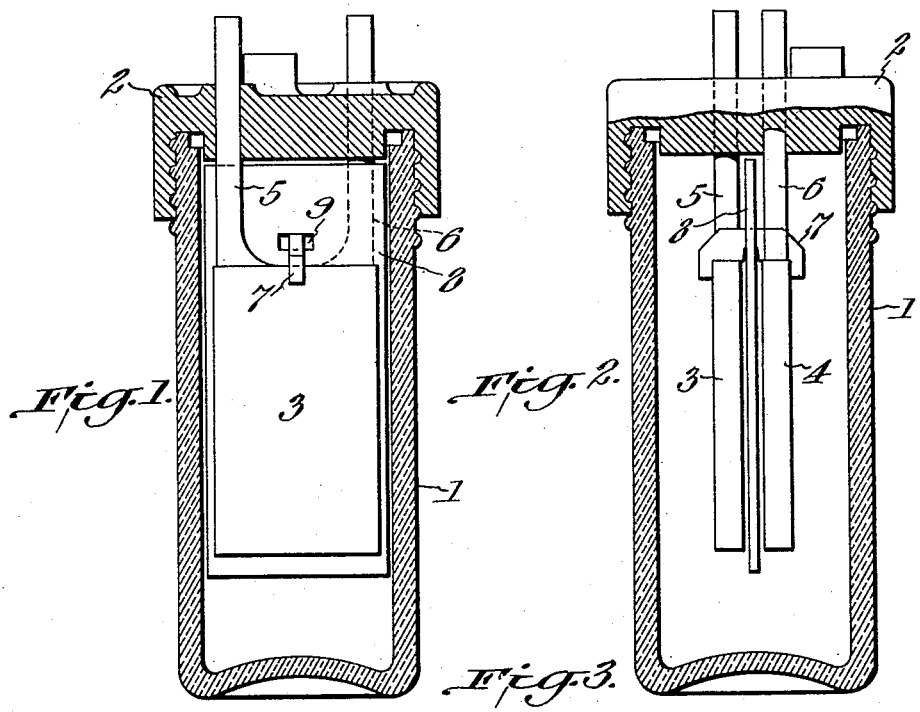
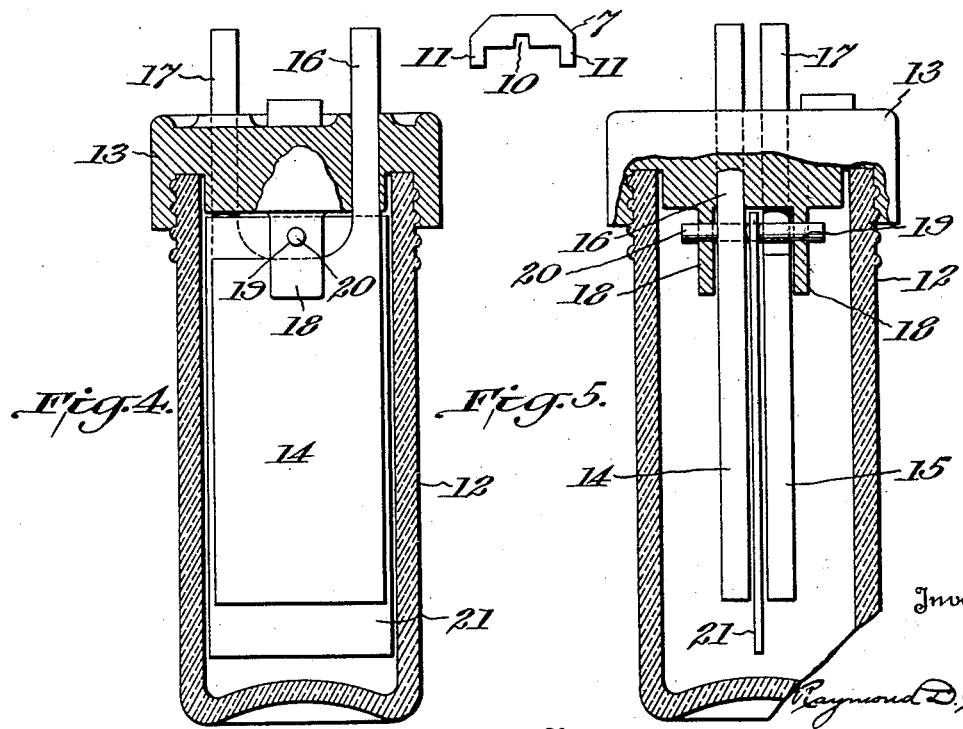

Patented Dec. 27, 1932

1,892,288

UNITED STATES PATENT OFFICE

RAYMOND D. SHIPP, OF INDIANAPOLIS, INDIANA, ASSIGNOR, BY MESNE ASSIGNMENTS, TO PREST-O-LITE STORAGE BATTERY CORPORATION, A CORPORATION OF INDIANA

STORAGE BATTERY

Application filed January 2, 1925. Serial No. 204.

This invention relates to means in a storage battery cell for positioning and supporting a separator between the electrode plates thereof, and for preventing said plates from spreading. The invention is particularly applicable to a cell having its electrode terminals extended through or secured to a screwed on cover, so that the electrodes necessarily turn with the cover, a construction commonly employed, for example, in radio "B" batteries.

It has been found desirable to brace the electrodes of a cell of this type against spreading. This has been accomplished heretofore by providing beneath the electrode a support of rubber, having a notch for receiving the lower ends of the electrodes. This support has been formed in addition, with a deeper notch for positioning a separator between the electrodes.

There are several objections to the rubber electrode support. Sediment caught by it is likely to short circuit the electrodes, particularly if the separator floats or is jarred out of the bottom of its notch in the support. The support, contacting as it does with the container, is hard to turn, so that it opposes the turning of the electrodes and cover, and this tends to disarrange the electrodes, and to strain the connections between the electrodes and the cover at the screwing on of the cover. The rubber support, the electrodes, and the separator, are unconnected, and therefore are awkward to assemble and to keep together when the cover is being screwed on the container.

It is an object of the present invention to provide means for bracing the electrodes and supporting the separator, which are free from the objections noted. The electrodes are accordingly suspended from the cover without any support from below and in one embodiment provision is made of a non-conducting yoke upon the tops of the electrode plates that embraces them, to hold them against spreading. A separator secured to the yoke, hangs from it between the electrodes, and forms with it a unit which is so interfitted with the electrodes that it cannot be accidentally detached from them. The electrodes, the yoke, and the separator as thus suspended together from the cover, may turn freely therewith, and have no tendency to become disarranged when the cover is being screwed on. The accumulation of sediment in proximity to the electrodes is also avoided.

In another embodiment lugs integral with the cover engage the outer faces of the electrodes to keep them from spreading. These lugs and separators are provided with openings through which a pin is inserted to support the separator between the plates.

Other objects and advantages will hereinafter appear.

In the drawing, Fig. 1 is a vertical sectional view of a battery cell embodying the improvements of the present invention.

Fig. 2 is also a vertical sectional view of the same cell, the section being taken at right angle to the section of Fig. 1;

Fig. 3 is an elevation of the yoke employed in this cell;

Fig. 4 is a vertical sectional view of a cell showing another embodiment of the invention; and Fig. 5 is another vertical sectional view thereof, the section being taken at right angles to the section of Fig. 4.

In Figs. 1 to 3 the battery cell comprises a jar or container 1 of insulating material, such as glass, having an insulating cap or cover 2, preferably of hard rubber, screwed thereon. Flat positive and negative electrode plates 3 and 4 are suspended in parallel relation, from the cover 2, by stems 5 and 6 securely fixed therein. The stems 5 and 6 extend through the cover 2 and serve as conducting terminals for the cell. A yoke 7, which may be of hard rubber or other acid-resistant non-conducting rigid material, spans and embraces the electrodes 3 and 4 at their upper ends to prevent them from spreading, and also supports a separator 8 between the electrodes 3 and 4. In assembling the yoke 7, the separator 8 and the electrodes 3 and 4, the separator is first placed between the electrodes with the slot 9 in its upper portion located between the stems 5 and 6 and above the electrodes. The yoke 7 is turned on its side and passed sidewise through the slot 9 in the separator until the notch 10 at the middle of the yoke is caused to register with the separator slot 9. The yoke 7 is then turned upright to interlock its notched portion with the separator 8. The yoke 7 and separator 8, thus connected, can not be accidentally detached from the electrodes 3 and 4 because the yoke can not be moved past the stems 5 and 6. The cover 2, the electrodes 3 and 4, the anti-spreading yoke 7, and the separator 8 form a unitary structure that may be conveniently assembled with the container by screwing the cover on the container 1. There are no parts of this unit which rub against the container with substantial pressure. Hence the connections between the stems 5 and 6, and the cover 2, are not strained, and the parts are not disarranged when the cover is screwed down.

The separator 8 extends beyond the side edges of the electrodes 3 and 4 almost to the walls of the container jar 1. The extent of lateral movement of the separator 8 is preferably small so that the electrode plates 3 and 4 will not be uncovered by the separator.

The weight of the yoke 7 may hold the separator 8 and the yoke in place. Provision is made however to prevent uncovering of the electrodes 3 and 4 or dislodgment of the yoke 7 from operative engagement with the electrodes in case the combined separator and yoke are set afloat by the electrolyte. The separator 8 extends nearly into contact with the cover 2 at its upper end, the distance between the separator and the cover being less than the length of the yoke fingers 11 that lie outside the electrodes 3 and 4, so that the fingers can not clear the tops of the electrodes when the parts are operatively assembled. The separator 8 also extends, at its lower end, a considerable distance below the electrode plates 3 and 4, so that the plates can not be uncovered by the slight vertical shifting of the separator which might result from its being floated or jarred.

Although the yoke 7 and separator 8 are securely attached for convenience in assembly and permanence of arrangement in use, they can be very readily detached when it becomes necessary to inspect or replace the separator. In order to detach them it is only necessary to turn the yoke 7 on its side and withdraw it from the slot 9.

In Figs. 4 and 5 the battery container 12 has the insulating rubber cover 13 screwed upon it. Flat electrode plates 14 and 15 are suspended in parallel relation from the cover 13 by stems 16 and 17 which extend through the cover and form the cell terminals. Lugs 18 integral with the cover 13 or otherwise suitably secured thereto, extend down into positions to engage the outer faces of the electrodes to prevent spreading apart thereof. These lugs have aligned openings 19 above the electrodes. A pin 20 of insulating material, such as hard rubber is inserted through these openings and forms a support for a separator 21 interposed between the electrodes 14 and 15. In assembling these parts the separator is first placed between the electrodes in position to receive the pin 20 and the pin is then passed through the openings 19 and through the separator. The pin may be made to fit the openings 19 rather snugly so that it will be retained in place. In this form of the invention the separator is caused to extend above and below the electrodes and beyond both ends thereof. No play of the separator is permitted so that there is no possibility of the electrodes becoming uncovered by the separator.

Variations may be resorted to within the scope of the invention, and parts of the improvements may be used without others.

I claim:

1. In a storage battery cell, the combination with a container, and a pair of electrodes supported entirely from above, of a yoke resting on the electrodes and embracing them to keep them from spreading, and a separator attached to said yoke and suspended from it between the electrodes, the lower portion of the container being entirely free from sediment catching surfaces in proximity to the electrodes.

2. In a storage battery cell, the combination with a container, and a pair of electrodes supported entirely from above, of a yoke supported solely by the electrodes and having depending portions engaging the outer surfaces of said electrodes at the upper extremities to keep them from spreading laterally the lower portion of the container being entirely free from sediment catching surfaces in proximity to the electrodes.

3. In a storage battery cell, the combination with a container, and a cover therefor, of a pair of electrodes suspended from the cover, a separator between the electrodes, and a separator support resting on the electrodes and attached to the separator, said support having downturned fingers embracing the upper ends of the electrodes, and a central separator positioning notch.

4. In a storage battery cell, the combination with a container, and a cover therefor, of a pair of electrodes suspended from the cover, a separator between the electrodes having a slot above the electrodes, a separator support insertable in said slot only when turned on its side, said support having a central notch enabling it to be turned upright after it has been inserted in the slot, for interlocking engagement with the separator.

5. In a storage battery cell, the combination with a container, and a pair of electrodes therein, of a single anti-spreading yoke supported by the upper ends of the electrodes at the centers thereof and embracing them, and means above the electrodes for limiting the vertical movement of the yoke to prevent disarrangement of the yoke and the electrodes.

In testimony whereof, I affix my signature.

RAYMOND D. SHIPP.